US012062327B2

(12) United States Patent
Li et al.

(10) Patent No.: US 12,062,327 B2
(45) Date of Patent: Aug. 13, 2024

(54) ARRAY SUBSTRATE AND DRIVING METHOD THEREFOR, AND DISPLAY APPARATUS

(71) Applicants: BOE MLED Technology Co., Ltd., Beijing (CN); BOE Technology Group Co., Ltd., Beijing (CN)

(72) Inventors: Xiuling Li, Beijing (CN); Qibing Gu, Beijing (CN); Guofeng Hu, Beijing (CN); Hongge Mei, Beijing (CN); Nana Gao, Beijing (CN); Bao Fu, Beijing (CN); Xiangyi Chen, Beijing (CN); Lingyun Shi, Beijing (CN); Wenchieh Huang, Beijing (CN)

(73) Assignees: BOE MLED TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/044,664

(22) PCT Filed: Jan. 8, 2021

(86) PCT No.: PCT/CN2021/070955
§ 371 (c)(1),
(2) Date: Mar. 9, 2023

(87) PCT Pub. No.: WO2022/147791
PCT Pub. Date: Jul. 14, 2022

(65) Prior Publication Data

US 2023/0326398 A1 Oct. 12, 2023

(51) Int. Cl.
*G09G 3/32* (2016.01)

(52) U.S. Cl.
CPC ....... *G09G 3/32* (2013.01); *G09G 2300/0452* (2013.01); *G09G 2310/0202* (2013.01); *G09G 2310/08* (2013.01)

(58) Field of Classification Search
CPC ............ G09G 3/32; G09G 2300/0452; G09G 2310/0202; G09G 2310/08
See application file for complete search history.

(56) References Cited

U.S. PATENT DOCUMENTS 10,127,858 B1 11/2018 Zhou
10,395,589 B1 8/2019 Vahid Far et al.
(Continued)

FOREIGN PATENT DOCUMENTS

CN 102135691 A 7/2011
CN 102282675 A 12/2011
(Continued)

OTHER PUBLICATIONS

International Search Report and Written Opinion, mailed Sep. 28, 2021, from PCT/CN2021/070955, 18 pages.
(Continued)

*Primary Examiner* — Sardis F Azongha
(74) *Attorney, Agent, or Firm* — Workman Nydegger

(57) ABSTRACT

An array substrate and a driving method therefor, and a display apparatus are disclosed. The array substrate includes: a base substrate; and a plurality of pixels located on the base substrate, where the plurality of pixels are arranged in an array in a first direction and a second direction. At least one pixel of the plurality of pixels includes: sub-pixels, and a pixel driving chip for driving each sub-pixel in the pixel. The array substrate further includes: a plurality of addressing signal lines located on the base substrate, where the addressing signal lines are coupled to addressing signal ends of pixel driving chips of a row of
(Continued)

the pixels arranged in the first direction; and a plurality of data lines located on the base substrate, where the data lines are coupled to data signal ends of pixel driving chips of a column of the pixels arranged in the second direction.

12 Claims, 4 Drawing Sheets

(56) References Cited

U.S. PATENT DOCUMENTS

| | | | | |
|---|---|---|---|---|
| 10,997,899 | B1 * | 5/2021 | Bae | G09G 3/2092 |
| 11,087,672 | B1 * | 8/2021 | Zheng | G09G 3/32 |
| 2003/0155943 | A1 | 8/2003 | Morishita | |
| 2005/0258771 | A1 | 11/2005 | Kang et al. | |
| 2008/0136964 | A1 | 6/2008 | Yamazaki | |
| 2009/0284501 | A1 | 11/2009 | Nathan et al. | |
| 2010/0123694 | A1 | 5/2010 | Cok et al. | |
| 2010/0164932 | A1 | 7/2010 | Kim et al. | |
| 2011/0032263 | A1 | 2/2011 | Ogawa et al. | |
| 2012/0069286 | A1 | 3/2012 | Huang et al. | |
| 2014/0111559 | A1 | 4/2014 | Yang et al. | |
| 2016/0180823 | A1 | 6/2016 | Cho et al. | |
| 2016/0253967 | A1 | 9/2016 | Gai et al. | |
| 2016/0358534 | A1 | 12/2016 | Kim | |
| 2017/0205676 | A1 | 7/2017 | Li et al. | |
| 2017/0358257 | A1 | 12/2017 | Lin et al. | |
| 2018/0190211 | A1 | 7/2018 | Sakariya et al. | |
| 2018/0204507 | A1 | 7/2018 | Matsumoto | |
| 2019/0088681 | A1 | 3/2019 | Mu | |
| 2019/0295457 | A1 * | 9/2019 | Li | G09G 3/32 |
| 2020/0185489 | A1 * | 6/2020 | Jo | H10K 59/1315 |
| 2021/0256926 | A1 * | 8/2021 | Yun | G09G 3/3677 |
| 2022/0020316 | A1 * | 1/2022 | Gray | G09G 3/2085 |
| 2022/0130323 | A1 | 4/2022 | Lu | |

FOREIGN PATENT DOCUMENTS

| | | | | | |
|---|---|---|---|---|---|
| CN | 103163704 | A | | 6/2013 | |
| CN | 103996378 | A | | 8/2014 | |
| CN | 104464603 | A | | 3/2015 | |
| CN | 204270000 | U | | 4/2015 | |
| CN | 104919900 | A | | 9/2015 | |
| CN | 104965367 | A | | 10/2015 | |
| CN | 105372891 | A | | 3/2016 | |
| CN | 105589273 | A | | 5/2016 | |
| CN | 109346001 | A | | 2/2019 | |
| CN | 110191536 | A | | 8/2019 | |
| CN | 209560977 | U | | 10/2019 | |
| CN | 110544455 | A | | 12/2019 | |
| CN | 110955091 | A | | 4/2020 | |
| CN | 111243496 | A | * | 6/2020 | G09G 3/32 |
| CN | 111243496 | A | | 6/2020 | |
| CN | 111293142 | A | | 6/2020 | |
| CN | 111696478 | A | | 9/2020 | |
| CN | 211654192 | U | | 10/2020 | |
| TW | 200832336 | A | | 8/2008 | |
| TW | 201033967 | A | | 9/2010 | |

OTHER PUBLICATIONS

Chinese First Office Action, mailed Apr. 21, 2023, from Chinese Application No. 202180000026.4, 20 pages.
Taiwan Office Action, mailed Aug. 10, 2022, from Taiwan Application No. 110136839, 8 pages.
Taiwan Notice of Allowance, mailed Nov. 1, 2022, from Taiwan Application No. 110136839, 4 pages.
European Partial Supplementary Search Report, mailed Nov. 2, 2023, from EP Application No. 21916846.5, 17 pages.
Chinese Second Office Action, mailed Dec. 27, 2023, from CN Application No. 202180000026.4, 21 pages.
Extended European Search Report, mailed Mar. 22, 2024, from EP Application No. 21916846.5, 20 pages.
Chinese Decision of Rejection, mailed Apr. 8, 2024, from Chinese Application No. 202180000026.4, 19 pages.

* cited by examiner

ARRAY SUBSTRATE AND DRIVING METHOD THEREFOR, AND DISPLAY APPARATUS

This application is a National Stage of International Application No. PCT/CN2021/070955, filed on Jan. 8, 2021, which is hereby incorporated by reference in its entirety.

FIELD

The present disclosure relates to the technical field of display, and particularly to an array substrate and a driving method therefor, and a display apparatus.

BACKGROUND

With the continuous development of a light emitting diode (LED) technology, micro-LEDs refer to that the size of LEDs is reduced to 300 microns or less, and thousands, tens of thousands, or even more micro-LEDs are fixed to a substrate to enable more detailed local dimming and present a display picture with high contrast and high color representation.

In the related art, a micro light emitting diode display device employs a passive matrix (PM) driving method that needs to make a large number of signal wirings on a glass substrate, making the bonding of the signal wirings more difficult, and in particular, for spliced display products, a side wiring process is required to further increase the process difficulty. Also, a multiplexer (MUX) needs to be used to reduce the number of signal wirings due to an insufficient thickness of a metal layer where signal wirings are made and the limitation of the number of layers, but a high proportion of the multiplexer may cause the power of the micro light emitting diode display device to be too high.

SUMMARY

An embodiment of the present disclosure provides an array substrate, including: a base substrate; a plurality of pixels located on the base substrate; where the plurality of the pixels are arranged in an array in a first direction and a second direction, and the first direction and the second direction intersect each other; at least one pixel of the plurality of the pixels includes sub-pixels, and a pixel driving chip for driving each of the sub-pixels in the pixel; where a sub-pixel of the sub-pixels includes at least one light emitting diode; and the pixel driving chip includes a data signal end and an addressing signal end; a plurality of addressing signal lines located on the base substrate; where an addressing signal line of the addressing signal lines is coupled to addressing signal ends of pixel driving chips of a row of the pixels arranged in the first direction; and a plurality of data lines located on the base substrate; where a data line of the data lines is coupled to data signal ends of pixel driving chips of a column of the pixels arranged in the second direction.

Optionally, in an embodiment of the present disclosure, the addressing signal lines extend in the first direction and are arranged in the second direction; and the addressing signal line is located in a gap between two adjacent rows of the pixels arranged in the first direction.

Optionally, in an embodiment of the present disclosure, the array substrate further includes: a plurality of addressing signal transfer lines; the plurality of the addressing signal transfer lines extend in the second direction and are arranged in the first direction; the plurality of the addressing signal transfer lines are in one-to-one correspondence to the plurality of the addressing signal lines; and the addressing signal transfer lines and the addressing signal lines are arranged in different layers, and each addressing signal transfer line is coupled to a corresponding addressing signal line through a first via hole; and the first via hole penetrates an insulation layer between the addressing transfer line and the addressing signal line.

Optionally, in an embodiment of the present disclosure, the data lines extend in the second direction and are arranged in the first direction; and the data line is located in a gap between two adjacent columns of the pixels arranged in the first direction.

Optionally, in an embodiment of the present disclosure, the array substrate further includes: a plurality of power signal lines, and a plurality of fixed voltage signal lines; the pixel driving chip further includes: a signal channel end and a fixed voltage signal end; the power signal lines are coupled to first electrodes of light emitting diodes of a column of the pixels arranged in the second direction; and second electrodes of the light emitting diodes in the pixels are respectively coupled to signal channel ends of the pixel driving chips; and the fixed voltage signal lines are coupled to fixed voltage signal ends of the pixel driving chips of a column of the pixels arranged in the second direction.

Optionally, in an embodiment of the present disclosure, the pixel includes at least: a red sub-pixel, a green sub-pixel, and a blue sub-pixel; the plurality of the power signal lines are divided into a plurality of first power signal lines and a plurality of second power signal lines; the first power signal lines are coupled to first electrodes of the red sub-pixels of a column of the pixels arranged in the second direction; and the second power signal lines are coupled to first electrodes of green sub-pixels and blue sub-pixels of a column of the pixels arranged in the second direction.

Optionally, in an embodiment of the present disclosure, the array substrate further includes a plurality of auxiliary signal lines; the auxiliary signal lines extend in the first direction and are arranged in the second direction; an auxiliary signal line of the auxiliary signal lines is located in a gap between two adjacent rows of the pixels arranged in the first direction; and the auxiliary signal lines and the fixed voltage signal lines are arranged in different layers, and the auxiliary signal line is coupled to at least one fixed voltage signal line through a second via hole; and the second via hole penetrates an insulating layer between the auxiliary signal line and the fixed voltage signal line.

Accordingly, an embodiment of the present disclosure also provides a display apparatus, including any one of the array substrates described above.

Accordingly, an embodiment of the present disclosure also provides a driving method for any one of the array substrates described above, including: each display frame including at least: an address assignment phase and a data signal transfer phase; sequentially inputting addressing information into each addressing signal line in the address assignment phase; where the addressing information includes address information corresponding to a row of pixels arranged in a first direction; and separately inputting data information into each data line in the data signal transfer phase; where the data information includes a plurality of pieces of sub-data information; and each piece of sub-data information includes address information corresponding to a row of pixels arranged in a first direction, and pixel data information, corresponding to the address information, of the pixel coupled to the data line.

Optionally, in an embodiment of the present disclosure, the addressing information includes a start instruction, the address information, an interval instruction, and an end instruction which are set in sequence.

Optionally, in an embodiment of the present disclosure, the sub-data information includes a start instruction, the address information, a data transfer instruction, an interval instruction, the pixel data information, and an end instruction which are set in sequence.

Optionally, in an embodiment of the present disclosure, each display frame further includes: a current setting phase prior to the data signal transfer phase; the method further includes: inputting current setting information into each data line in the current setting phase.

DETAILED DESCRIPTION OF EMBODIMENTS

Figure 1:
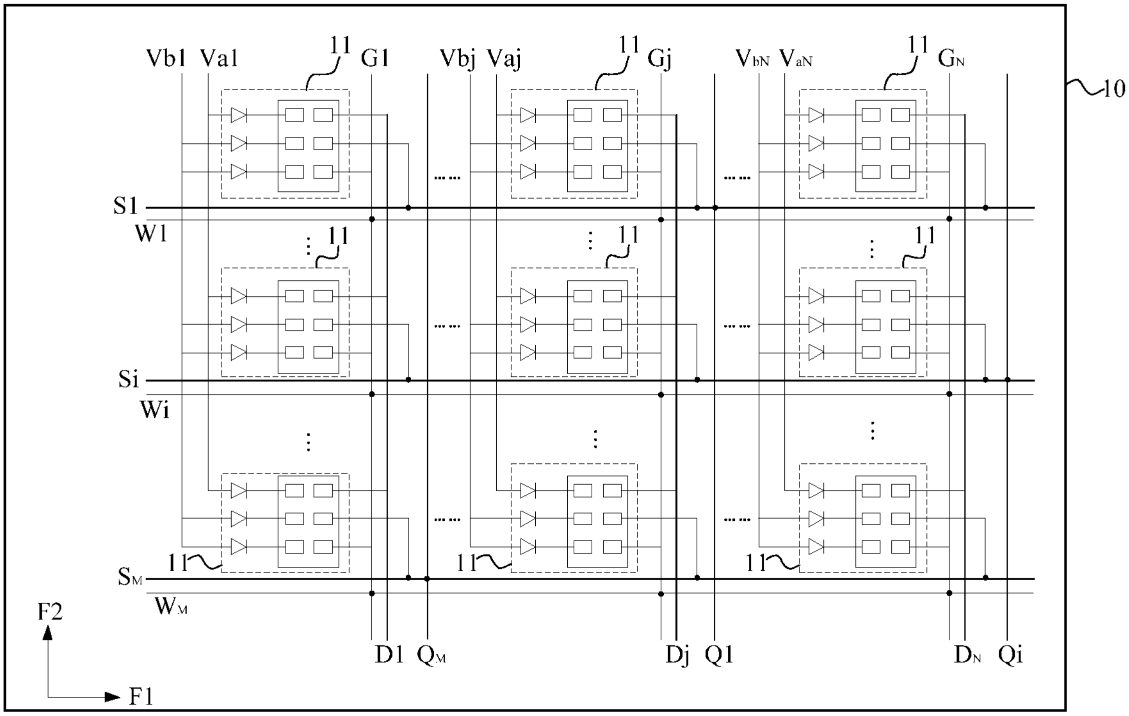
FIG. 1 is a planar structural schematic diagram of an array substrate according to an embodiment of the present disclosure.

Embodiments of the present disclosure provide an array substrate and a driving method therefor, and a display apparatus.

Specific implementations of the array substrate and the driving method therefor, and the display apparatus provided by embodiments of the present disclosure are described in detail below with reference to the accompanying drawings. The sizes and shapes of the structures in the drawings do not reflect a true scale, but are only intended to illustrate the contents of the present disclosure.

Figure 2:
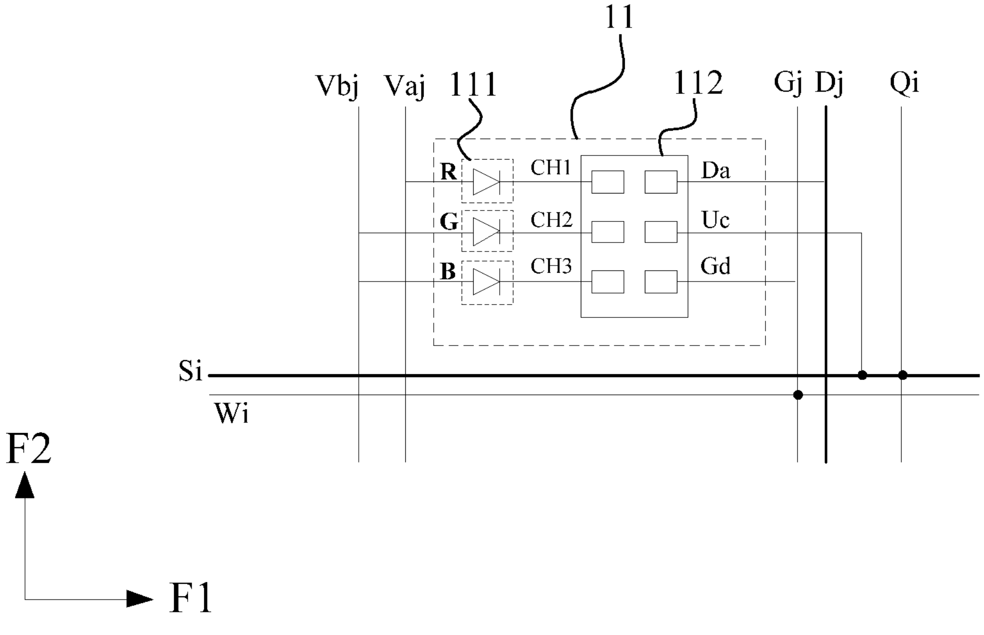
FIG. 2 is a schematic diagram of a connection relationship of a pixel according to an embodiment of the present disclosure.

FIG. 1 is a planar structural schematic diagram of an array substrate according to an embodiment of the present disclosure. As shown in FIG. 1, the array substrate provided by an embodiment of the present disclosure may include: a base substrate 10; a plurality of pixels 11 located on the base substrate 10; where the plurality of the pixels 11 are arranged in an array in a first direction F1 and a second direction F2, and the first direction F1 and the second direction F2 intersect each other; FIG. 2 is a schematic diagram of a connection relationship of a pixel 11 according to an embodiment of the present disclosure, and in conjunction with FIGS. 1 and 2, at least one pixel 11 of the plurality of the pixels 11 includes sub-pixels 111, and a pixel driving chip 112 for driving each of the sub-pixels 111 in the pixel 11; where each sub-pixel 111 includes at least one light emitting diode; and the pixel driving chip 112 includes: a data signal end Da and an addressing signal end $U_c$; M addressing signal lines S located on the base substrate 10; where the addressing signal lines $S_i$ ($0<i\leq M$, i being a positive integer) are coupled to addressing signal ends $U_c$ of pixel driving chips 112 of a row of the pixels 11 arranged in the first direction F1; and N data lines D located on the base substrate 10; where the data lines $D_j$ ($0<j\leq N$, j being a positive integer) are coupled to data signal ends Da of the pixel driving chips 112 of a row of the pixels arranged in the second direction F2.

It should be noted that the first direction may be a row direction and the second direction may be a column direction; or, the first direction may be a column direction and the second direction may be a row direction, which is not limited here. For convenience of explanation, in an embodiment of the present disclosure, the first direction is a row direction, and the second direction is a column direction.

In the array substrate provided by an embodiment of the present disclosure, at least one pixel includes the sub-pixels and the pixel driving chip, and pixel-level fine driving can be achieved by directly driving the sub-pixels in the pixel to emit light using the pixel driving chip. By providing the plurality of the addressing signal lines and the plurality of the data signal lines, during driving, addressing information is sequentially input into each addressing signal line, and a plurality of pieces of sub-data information are separately input into respective data lines, such that each pixel driving chip respectively provides the sub-data information to the corresponding sub-pixels, thus realizing an active matrix driving method, and greatly reducing the number of signal wirings on the base substrate, the array substrate has a sufficient space for layout of the signal wirings, the resistance of the signal wirings can be reduced by increasing the width of the signal wirings and other wiring methods, and without increasing the thickness of the signal wirings, the brightness of the light emitting diodes can be increased, thereby reducing the power of the array substrate. At the same time, the number of the signal wirings can be greatly reduced, which in turn reduces the width of a bonding area and the bonding difficulty of the bonding area and the signal wirings.

Figure 3:
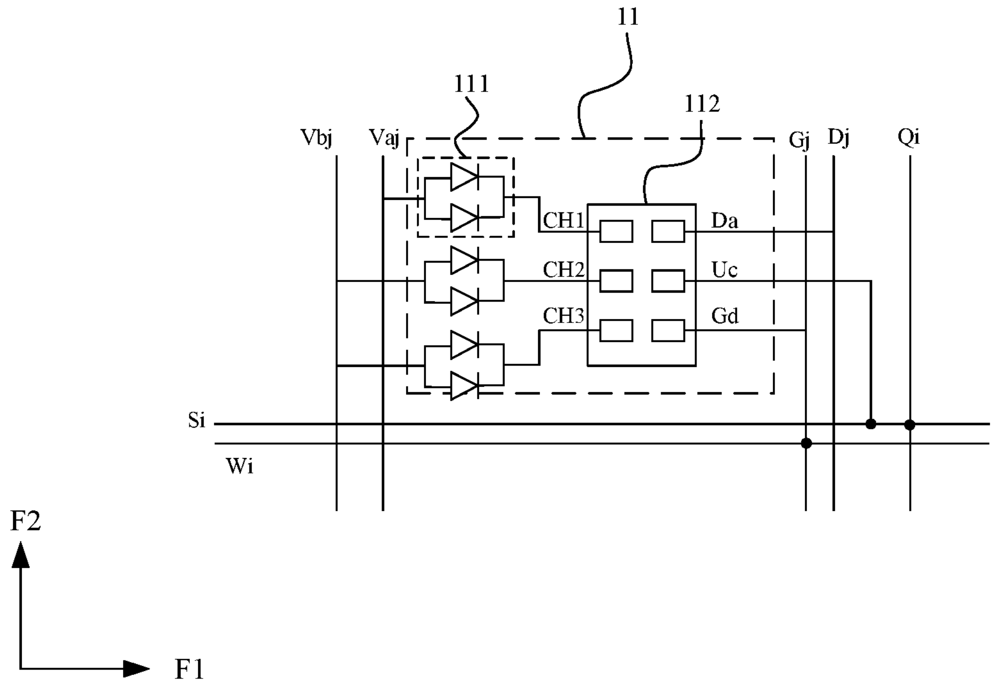
FIG. 3 is a schematic diagram of another connection relationship of a pixel according to an embodiment of the present disclosure.

In an embodiment of the present disclosure, the light emitting diodes may be sub-millimeter light emitting diodes (micro light emitting diodes) or may be micro light emitting diodes (micro LEDs), which is not limited here. In FIGS. 1 and 2, the condition that each sub-pixel includes one light emitting diode is taken as an example, in specific implementation, more light emitting diodes may also be included in each sub-pixel, for example, each sub-pixel may include two light emitting diodes in FIG. 3, and the number of light emitting diodes in each sub-pixel is not limited here. For ease of control, when at least two light emitting diodes are included in each sub-pixel, colors of the light emitting diodes in the sub-pixel are the same, and of course, the colors of the light emitting diodes in the sub-pixel may not be exactly the same in some cases, which is not limited here. In FIG. 3, the light emitting diodes in the sub-pixels are connected in parallel, and the light emitting diodes in the sub-pixel may also be connected in series, which is not limited here.

Optionally, in the above array substrate provided by an embodiment of the present disclosure, as shown in FIG. 1, the addressing signal lines $S_i$ extend in the first direction F1 and are arranged in the second direction F2; and each addressing signal line $S_i$ is located in a gap between two adjacent rows of the pixels 11 arranged in the first direction F1. In this way, the addressing signal lines $S_i$ can be more easily connected to the corresponding rows of the pixels 11, facilitating wiring, and preventing crossover between signal wirings.

In specific implementation, the above array substrate provided by an embodiment of the present disclosure, with continued reference to FIG. 1, may further include: M addressing signal transfer lines Q; the M addressing signal transfer lines Q extend in the second direction F2 and are arranged in the first direction F1; the addressing signal transfer lines $Q_i$ ($0<i\leq M$, i being a positive integer) are in one-to-one correspondence with the addressing signal lines $S_i$, e.g., an addressing signal transfer line $Q_1$ corresponds to an addressing signal line $S_1$; and the addressing signal transfer lines Q and the addressing signal lines S are arranged in different layers, and each addressing signal transfer line $Q_i$ is coupled to the corresponding addressing signal line $S_i$ through a first via hole (as indicated by a black circle at the intersection of each addressing signal transfer line $Q_i$ with the corresponding addressing signal line $S_i$ in the figure); and the first via hole penetrates an insulation layer between the corresponding addressing signal transfer line $Q_i$ and the corresponding addressing signal line $S_i$.

If the addressing signal transfer lines $Q_i$ are not provided, then signal sources need to be arranged at both ends in the direction in which the addressing signal lines $S_i$ extend, increasing an area of a bezel area of the array substrate. In an embodiment of the present disclosure, by providing the addressing signal transfer lines $Q_i$ extending in the second direction F2, addressing signals can be provided to the corresponding addressing signal lines $S_i$ through the addressing signal transfer lines $Q_i$, thus, signal sources for signal lines such as the addressing signal lines $S_i$ and the data lines $D_j$ can be arranged at the same side of the array substrate, e.g., the signal sources can be arranged at at least one of the two ends of the addressing signal transfer lines $Q_i$, thereby reducing the area of the bezel area of the array substrate. The signal source may provide an addressing signal to the addressing signal transfer lines $Q_i$, e.g., the signal source may be a driver chip.

Optionally, in order to avoid the influence of the addressing signal transfer lines $Q_i$ on light emission of the light emitting diodes, each addressing signal transfer line $Q_i$ may be disposed in a gap between two adjacent columns of pixels, and in an actual application, the addressing signal transfer lines $Q_i$ may be more evenly distributed in gaps, e.g., one addressing signal transfer line $Q_i$ may be disposed on the same side of each column of pixels when the number of rows and the number of columns in the array substrate are equal. When the number of rows is greater than the number of columns in the array substrate, one addressing signal transit line $Q_i$ may be disposed in a gap between every two adjacent columns of pixels, and two addressing signal transfer lines $Q_i$ may be disposed in at least some of the gaps.

Optionally, in the above array substrate provided by an embodiment of the present disclosure, as shown in FIG. 1, the data lines $D_j$ extend in the second direction F2 and are arranged in the first direction F1; and each data line $D_j$ is located in a gap between two adjacent columns of the pixels 11 arranged in the first direction F1. In this way, the data lines $D_j$ can be more easily connected to the corresponding columns of the pixels 11, facilitate wiring, and prevent crossover between signal wirings.

In addition, the above array substrate provided by an embodiment of the present disclosure, in conjunction with FIGS. 1 and 2, may further include: N power signal lines Va and Vb, and N fixed voltage signal lines G; each pixel driving chip 112 may further include: a signal channel end CH (e.g., $CH_1$, $CH_2$, or $CH_3$) and a fixed voltage signal end Gd; and the power signal lines $Va_j$ and $Vb_j$ are coupled to first electrodes of light emitting diodes of a column of the pixels 11 arranged in the second direction F2; and second electrodes of the light emitting diodes in the pixels 11 are respectively coupled to signal channel ends CH of the pixel driving chips 112. The first electrodes may be positive electrodes of the light emitting diodes, and the second electrodes may be negative electrodes of the light emitting diodes.

The fixed voltage signal lines $G_j$ ($0<j\leq N$, j being a positive integer) are coupled to fixed voltage signal ends Gd of the pixel driving chips 112 of a column of the pixels 11 arranged in the second direction F2.

The power signal lines $Va_j$ (or $Vb_j$) ($0<j\leq N$, being a positive integer) are coupled to the first electrodes of the light emitting diodes, thus, the power signal lines $Va_j$ (or $Vb_j$) can provide power to the light emitting diodes, and the second electrodes of the light emitting diodes are coupled to the signal channel ends CH of the pixel driving chips 112, and the fixed voltage signal lines $G_j$ are coupled to the fixed voltage signal ends Gd of the pixel driving chips 112, and the fixed voltage signal lines $G_j$ can provide a fixed voltage signal to the pixel driving chips 112 to form a power supply circuit. The light emitting diodes are current-driven elements, and the pixel driving chips 112 provide signal paths to the coupled light emitting diodes through the signal channel ends CH to enable the light emitting diodes to achieve different luminous brightness under the control of current signals of different current magnitudes and/or different duty cycles. Optionally, each power signal line $Va_j$ (or $Vb_j$) and each fixed voltage signal line $G_j$ may be disposed in a gap between two adjacent columns of pixels.

In specific implementation, in the above array substrate provided by an embodiment of the present disclosure, in conjunction with FIGS. 1 and 2, the pixel 11 includes at least a red sub-pixel R, a green sub-pixel G, and a blue sub-pixel B. The red sub-pixel R may include at least one red micro light emitting diode, the green sub-pixel G may include at least one green micro light emitting diode, and the blue sub-pixel B may include at least one blue micro light emitting diode.

The plurality of the power signal lines are divided into a plurality of first power signal lines $Va_j$ and a plurality of second power signal lines $Vb_j$.

The first power signal lines $Va_j$ are coupled to first electrodes of red sub-pixels R of a column of the pixels 11 arranged in the second direction F2.

The second power signal lines $Vb_j$ are coupled to first electrodes of green sub-pixels G and blue sub-pixels B of a column of the pixels 11 arranged in the second direction F2.

Due to different characteristics of light emitting diodes of different colors, a difference between a voltage required for the red sub-pixel and a voltage required for the green sub-pixel is large, the voltage required for the green sub-pixel is similar to a voltage required for the blue sub-pixel, and thus, the second power signal lines $Vb_j$ are coupled to the green sub-pixels G and the blue sub-pixels B in a column of the pixels 11, and the green sub-pixels G and the blue sub-pixels B share power signal lines, which can greatly reduce the number of the power signal lines and simplify the wiring of the array substrate.

Optionally, the above array substrate provided by an embodiment of the present disclosure, as shown in FIG. 1, may further include M auxiliary signal lines W.

The auxiliary signal lines $W_i$ ($0<i\leq M$, i being a positive integer) extend in the first direction F1 and are arranged in the second direction F2.

Each auxiliary signal line $W_i$ is located in a gap between two adjacent rows of the pixels 11 arranged in the first direction F1 to avoid affecting light emission of the sub-pixels.

The auxiliary signal lines W and the fixed voltage signal lines G are arranged in different layers, and each auxiliary signal line W is coupled to at least one fixed voltage signal line G through a second via hole (as indicated by a black circle at the intersection of the auxiliary signal line $W_i$ and the fixed voltage signal line $G_j$ in the figure); and the second via hole penetrates an insulating layer between the auxiliary signal line $W_i$ and the fixed voltage signal line $G_j$.

By providing the auxiliary signal lines $W_i$ which are in layers different from the fixed voltage signal lines $G_j$, and coupling the auxiliary signal lines $W_i$ to the fixed voltage signal lines GI through second via holes, the plurality of the fixed voltage signal lines G and the plurality of the auxiliary signal lines W form a grid-like parallel structure, and the resistance of the fixed voltage signal lines G is reduced to reduce a voltage drop of the fixed voltage signal lines $G_j$ and reduce signal delay on the fixed voltage signal lines $G_j$. Optionally, the second via holes may be formed in areas where there is overlap between orthogonal projections of the fixed voltage signal lines G and the auxiliary signal lines W on the base substrate to increase parallel areas of the fixed voltage signal lines $G_j$ and the auxiliary signal line $W_i$, further reducing signal delay on the fixed voltage signal lines $G_j$.

In an embodiment of the present disclosure, in order to save the process flow and save the manufacturing cost, the addressing signal lines $S_i$ and the auxiliary signal lines $W_i$ may be disposed in the same film layer, and the data lines $D_j$, the addressing signal transfer lines $Q_i$, the power signal lines $Va_j$ and $Vb_j$, and the fixed voltage signal lines G may be disposed in the same film layer. That is, signal wirings extending in the first direction F1 are disposed in the same film layer and signal wirings extending in the second direction F2 are disposed in the same film layer, and in this way, crossover between the signal wirings extending in the first direction F1 and the signal wirings extending in the second direction F2 which are located in the same film layer can also be avoided, reducing the wiring difficulty.

In specific implementation, referring to FIG. 1, a signal source can be disposed at an edge of the side of the array substrate extending in the first direction F1, the signal source can be coupled to the N data lines D, the M addressing signal transfer lines Q, the N power signal lines Va and the N power signal lines Vb, and the N fixed voltage signal lines G to provide corresponding drive signals to signal wirings extending in the second direction F2. Optionally, the signal source may be a field programmable gate array (FPGA), or an integrated circuit (IC), or a printed circuit board (PCB), or a flexible printed circuit (FPC), or a chip on flex (COF), or the like, which is not limited here. In an embodiment of the present disclosure, by providing a signal source, corresponding signals can be provided to the signal wirings, which can greatly increase the wiring space of the array substrate, thereby facilitating a narrow bezel of the array substrate.

Based on the same inventive concept, an embodiment of the present disclosure further provides a display apparatus, including the array substrate described above. The display apparatus can be applied to any product or component with a display function such as a mobile phone, a tablet computer, a television, a display, a notebook computer, a digital photo frame and a navigator. Since the principle of solving the problem of the display apparatus is similar to that of the array substrate described above, the implementation of the display apparatus can refer to the implementation of the array substrate described above, and repetitions are omitted here.

Based on the same inventive concept, an embodiment of the present disclosure further provides a driving method for any one of the above array substrates. The implementation of the driving method can refer to the implementation of the above array substrate since the principle of solving the problem of the driving method is similar to that of the above array substrate, and repetitions are omitted here.

Figure 4:
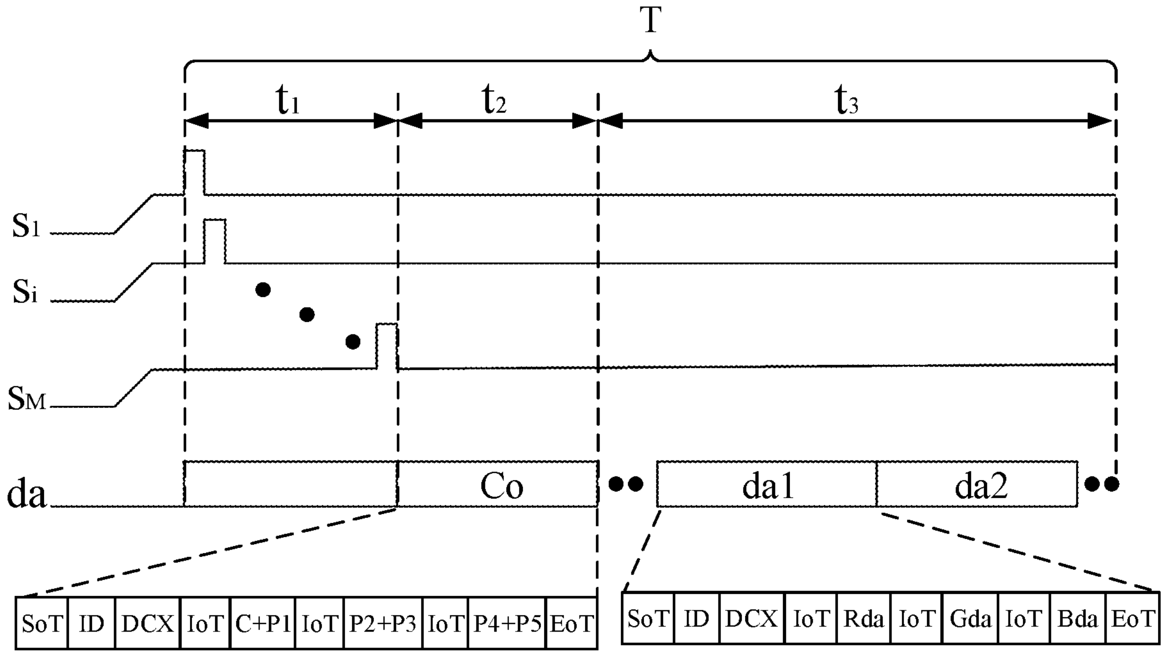
FIG. 4 is a timing diagram corresponding to a driving method according to an embodiment of the present disclosure.

FIG. 4 is a timing diagram corresponding to a driving method according to an embodiment of the present disclosure, and in combination with FIGS. 1 and 4, the driving method for any one of the above array substrates provided by an embodiment of the present disclosure may be as follows.

Each display frame T may include at least: an address assignment phase $t_1$ and a data signal transfer phase $t_3$.

Figure 5:
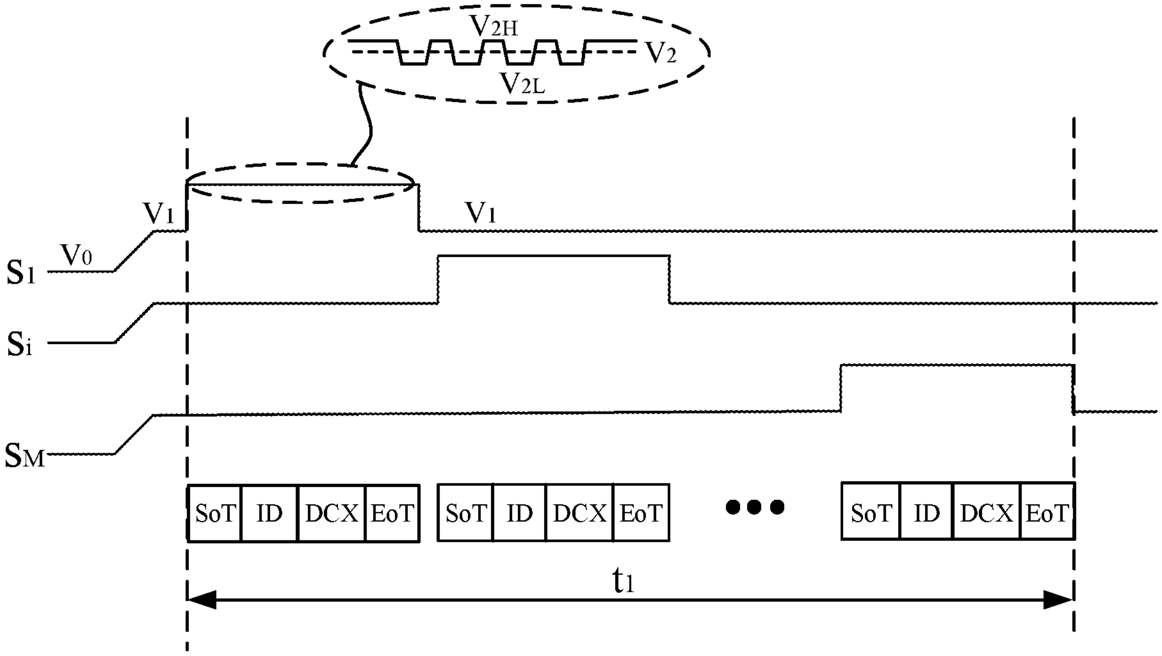
FIG. 5 is a schematic timing diagram of addressing information according to an embodiment of the present disclosure.

In the address assignment phase $t_1$, addressing information $s_i$ is sequentially input into each addressing signal line $S_i$. FIG. 5 is a schematic timing diagram of addressing information according to an embodiment of the present disclosure, and as shown in FIG. 5, the addressing information $s_i$ may include address information ID assigned to and corresponding to a row of the pixels 11 arranged in the first direction F1. For example, an addressing signal line $S_1$ assigns addressing information $s_1$ including address information ID of 00000001 to a first row of pixels 11 in the current rows arranged in the first direction F1, an addressing signal line $S_2$ assigns addressing information $s_1$ including address information ID of 00000010 to a second row of pixels 11 in the current rows arranged in the first direction F1, and so on to complete the address assignment process to the pixel driving chips in each pixel row.

In the data signal transfer phase $t_3$, data information da is separately input into each data line $D_j$. In particular, a plurality of pieces of sub-data information $da_i$ are sequentially input into each data line $D_j$, i.e. each piece of data information da includes a plurality of pieces of sub-data information $da_j$ arranged sequentially in a particular order (e.g. the particular order may be an order of arrangement of pixels in each column), such that the data line $D_j$ sequentially transmits the corresponding sub-data information $da_j$ to the pixel driving chips in the corresponding column of pixels. The sub-data information includes address information ID corresponding to each pixel 11, and pixel data information, corresponding to the address information ID, of the pixel 11 coupled to the data line $D_j$, and after receiving the sub-data information $da_i$, each pixel driving chip transmits the pixel data information to the corresponding pixel according to the address information ID in the sub-data information $da_i$. For example, in the data signal transfer phase $t_3$, the sub-data information $da_i$ is sequentially input into the data line $D_j$, and after the pixel driving chips coupled to the data line $D_j$ receive the sub-data information $da_i$, the sub-data information $da_i$ is decoded to obtain address information ID of 00000001, and pixel data information carried in the sub-data information $da_i$ is transmitted to the pixel 11 in a first row of the j-th column. Pixel data information corresponding to the plurality of pixels 11 arranged in the first direction F1 is included in the data information da, so that different pixels 11 are controlled to achieve different luminous brightness.

In the driving method provided by an embodiment of the present disclosure, the addressing information is sequentially input into each addressing signal line in the address assignment phase, the addressing information including address information ID of a corresponding pixel row, and data information is separately input into each data line in the data signal transfer phase; and sub-data information in the data information includes address information ID and pixel data information of the corresponding pixel row, and thus, the pixel data information of the pixel row can be separately transmitted to the corresponding sub-pixels after the pixel driving chips receive the pixel data information, thereby realizing an active matrix driving method.

Optionally, in the above driving method provided by an embodiment of the present disclosure, as shown in FIG. 5, the addressing information $s_i$ may include a start instruction SoT, address information ID, an interval instruction DCX, and an end instruction EoT which are set in sequence. In an actual application, address information ID in the addressing information $s_i$ corresponding to respective addressing signal lines $S_i$ is different, so that address information of pixels located in different rows is distinguished. In specific implementation, the length of the addressing information $s_i$ may be set to 12 bit, where the start instruction SoT may be set to 1 bit, the address information ID may be set to 8 bit, the interval instruction DCX may be set to 1 bit, and the end instruction EoT may be set to 2 bit.

As shown in FIG. 5, in specific implementation, an addressing function can be distinguished from other functions by distinguishing amplitudes of signals transmitted by the addressing signal lines $S_i$. For example, the addressing function is performed at a level $V_2$ of the signal amplitude (e.g., a voltage value of 3.3 V), and a display function is performed at a level $V_1$ of the signal amplitude (e.g., a voltage value of 1.8 V). During actual work, first, the amplitudes of the signals transmitted by the addressing signal lines $S_i$ need to rise from a level $V_0$ (e.g., 0V) to the level $V_1$ to make elements connected to the addressing signal lines $S_i$ enter working states, then the signal amplitude changes from the level $V_1$ to a fluctuation based on the level $V_2$, and the addressing signal lines $S_i$ perform the addressing function to modulate the fluctuation law of the signals transmitted by the addressing signal lines $S_i$. For example, the signals vary between a first amplitude $V_{2H}$ and a second amplitude $V_{2L}$, $V_1<V_{2L}<V_2<V_{2H}$, the addressing information $s_i$ can be modulated into the signals by modulating the law of variation of the first amplitude $V_1$ and the second amplitude $V_2$, so that the corresponding address information is transmitted while electrical energy is transferred. For example, the addressing information $s_i$ starts with the start instruction SoT, then transfers the address information ID and the interval instruction DCX, and finally ends the address assignment for the pixel row with the end instruction EoT. When the signal amplitude fluctuates from the level $V_2$ as a reference back to the level $V_1$ and remains at the level $V_1$ all the time, the addressing signal lines $S_i$ may be used to implement other functions, such as multiplexing s as a sensing signal line, which is not limited here, and the addressing signal lines $S_i$ may not have any function in this case.

Optionally, in the above driving method according to an embodiment of the present disclosure, as shown in FIG. 4, the sub-data information may include a start instruction SoT, an address information ID, a data transfer instruction DCX, an interval instruction IoT, pixel data information Rda, Gda, and Bda, and an end instruction EoT. When the data transfer instruction DCX is a set value, it is indicated that data transfer is performed, for example, when DCX=1, it is indicated that data transfer is performed, and when the pixel driving chip recognizes that DCX has a value of 1, the pixel data information in the sub-data information is transmitted to the corresponding light emitting diodes. The pixel data information Rda represents image data information required to drive the red sub-pixels to emit light, the pixel data information Gda represents image data information required to drive the green sub-pixels to emit light, and the pixel data information Bda represents image data information required to drive the blue sub-pixels to emit light. In specific implementation, the length of the sub-data information may be set to 63 bit, where the start instruction SoT accounts for 1 bit, the address information ID accounts for 8 bit, the data transfer instruction DCX accounts for 1 bit, the interval instruction IoT accounts for 1 bit, the pixel data information Rda, Gda or Bda respectively accounts for 16 bit, and the end instruction EoT accounts for 2 bit, and further, the interval instruction IoT may be set between adjacent pixel data information.

Figure 6:
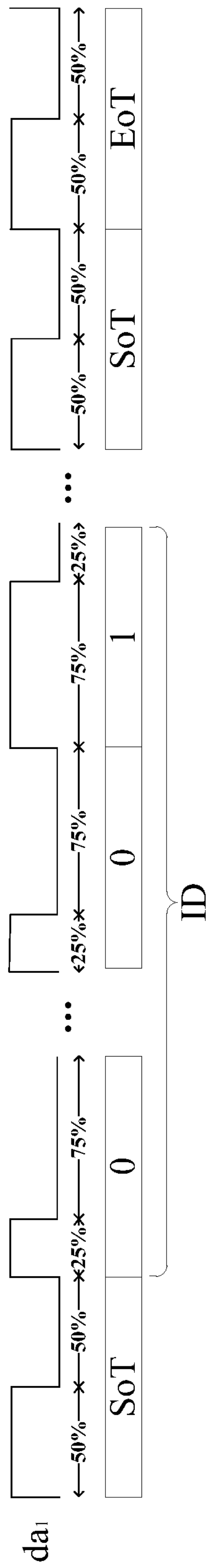
FIG. 6 is a schematic diagram of data signal encoding.

FIG. 6 is a schematic diagram of data signal encoding, and in FIG. 6, a timing sequence of the sub-data information $da_1$ is taken as an example, and as shown in FIG. 6, the meaning of each bit in the data information da can be represented by designing duty cycles in a pulse sequence. For example, when a duty cycle of a certain pulse in the pulse sequence is 25%, it is indicated that the bit is 0; when a duty cycle of a certain pulse is 75%, it is indicated that the bit is 1; when a duty cycle of a certain pulse is 50%, it is indicated that the bit is the start instruction SoT; and when duty cycles of two consecutive pulses are 50%, i.e. two consecutive SoTs occur, the two bits mean the end instruction EoT.

Further, in the above driving method provided by an embodiment of the present disclosure, as shown in FIG. 4, each display frame T may further include a current setting phase $t_2$ prior to the data signal transfer phase $t_3$, for example, the current setting phase $t_2$ may be positioned between the address assignment phase $t_1$ and the data signal transfer phase $t_3$.

With reference to FIGS. 1 and 4, in the current setting phase $t_2$, current setting information Co is input into each data line $D_j$. By inputting the current setting information into the data lines, driving currents of the pixel driving chips can be controlled, thereby further precisely controlling the display brightness of the corresponding pixels. In specific implementation, driving currents provided by different pixel driving chips may be set to be different. In specific implementation, address information ID may also be set in the current setting information Co so that the current setting information Co is input into the corresponding pixel rows.

Optionally, a length of the current setting information Co may be 63 bit, which may in particular include: a start instruction SoT of 1 bit, address information ID of 8 bits, a current setting instruction DCX of 1 bit, an interval instruction IoT of 1 bit, 16 bits of data composed together of a frame start instruction C and a control instruction P1 (e.g. representing a current magnitude correction coefficient that the signal channel end CH needs to provide to the light emitting diode), an interval instruction IoT of 1 bit, reserve control instruction bits P2+P3 of 16 bits, an interval instruction IoT of 1 bit, reserve control instruction bits P4+P5 of 16 bits, and an end instruction EoT of 2 bits. When the current setting instruction DCX is a set value, it is indicated that current setting is performed, for example, when DCX is 0, it is indicated that current setting is performed.

A driving process of a display frame T in an embodiment of the present disclosure will be described in detail below with reference to the timing sequence shown in FIG. 4.

In the address assignment phase $t_1$, the addressing signal lines $S_i$ are controlled to be enabled row by row, and the address information ID is sequentially written to the pixel driving chips in each row, i.e., the address information ID of the pixel driving chips in the same row may be the same, so that the pixel driving chips can obtain data information matched with their own addresses when data signals are received and analyzed by the pixel driving chips in the data signal transfer phase $t_3$.

In the current setting phase $t_2$, the current setting information Co is simultaneously input into all data lines $D_j$, each data line $D_j$ writes correction data to buffers of the pixel driving chips in the same pixel column. For example, due to manufacturers, batches, and the like, photoelectric characteristics of light emitting diodes in different pixels are inevitably different, which causes different pixels to exhibit different brightness when the display apparatus displays a solid color picture. In an embodiment of the present disclosure, in the current setting phase $t_2$, the display brightness of the light emitting diodes in the pixels can be adjusted by writing correction data to the pixel driving chips.

In the data signal transfer phase $t_3$, the data information da is simultaneously input into all data lines $D_j$, and each piece of data information da sequentially transmits the respective required data information to the pixel driving chips in the same pixel column, and after receiving and analyzing the data information da, the pixel driving chips can obtain the sub-data information $da_j$ matched with their own addresses, and drive the light emitting diodes to emit light according to the sub-data information $da_j$.

According to the array substrate and the driving method therefor, and the display apparatus provided by embodiments of the present disclosure, employing pixel-level constant current driving chips can directly drive the sub-pixels in the pixel to emit light, thus realizing pixel-level driving display. By providing the plurality of the addressing signal lines and the plurality of the data signal lines, during driving, the addressing information is sequentially input into each addressing signal line, and the plurality of pieces of sub-data information are separately input into each data line to control the pixel driving chips to provide the pixel data information to the sub-pixels, thus realizing an active matrix driving method and greatly reducing the number of signal wirings on the base substrate.

Although embodiments of the present disclosure have been described, those skilled in the art can make additional changes and modifications to these embodiments once they know the basic inventive concepts. Therefore, the appended claims are intended to be explained as including embodiments and all changes and modifications falling within the scope of the present disclosure.

Apparently, those skilled in the art can make various changes and modifications to embodiments of the present disclosure without departing from the spirit and the scope of embodiments of the present disclosure. Thus, if these changes and modifications of embodiments of the present disclosure fall within the scope of the claims of the present disclosure and their equivalents, the present disclosure is also intended to include these changes and modifications.

What is claimed is:

1. An array substrate, comprising:

a base substrate;

a plurality of pixels located on the base substrate; wherein the plurality of the pixels are arranged in an array in a first direction and a second direction, and the first direction and the second direction intersect each other; at least one pixel of the plurality of the pixels comprises sub-pixels, and a pixel driving chip for driving each of the sub-pixels in the pixel; wherein a sub-pixel of the sub-pixels comprises at least one light emitting diode; and the pixel driving chip comprises a data signal end and an addressing signal end;

a plurality of addressing signal lines located on the base substrate; wherein an addressing signal line of the addressing signal lines is coupled to addressing signal ends of pixel driving chips of a row of the pixels arranged in the first direction, and the addressing signal ends of the pixel driving chips of the row of the pixels arranged in the first direction are connected in parallel through the addressing signal line; and a plurality of data lines located on the base substrate; wherein a data line of the data lines is coupled to data signal ends of pixel driving chips of a column of the pixels arranged in the second direction, and the data signal ends of the pixel driving chips of the column of the pixels arranged in the second direction are connected in parallel through the data line;

wherein each of the pixel driving chips is configured to drive one of the pixels.

2. The array substrate according to claim 1, wherein the addressing signal lines extend in the first direction and are arranged in the second direction; and the addressing signal line is located in a gap between two adjacent rows of the pixels arranged in the first direction.

3. The array substrate according to claim 2, further comprising: a plurality of addressing signal transfer lines;

the plurality of the addressing signal transfer lines extend in the second direction and are arranged in the first direction;

the plurality of the addressing signal transfer lines are in one-to-one correspondence to the plurality of the addressing signal lines; and the addressing signal transfer lines and the addressing signal lines are arranged in different layers, and each addressing signal transfer line is coupled to a corresponding addressing signal line through a first via hole; and the first via hole penetrates an insulation layer between the addressing transfer line and the addressing signal line.

4. The array substrate according to claim 1, wherein the data lines extend in the second direction and are arranged in the first direction; and the data line is located in a gap between two adjacent columns of the pixels arranged in the first direction.

5. The array substrate according to claim 1, further comprising: a plurality of power signal lines, and a plurality of fixed voltage signal lines;

the pixel driving chip further comprises: a signal channel end and a fixed voltage signal end;

the power signal lines are coupled to first electrodes of light emitting diodes of a column of the pixels arranged in the second direction; and second electrodes of the light emitting diodes in the pixels are respectively coupled to signal channel ends of the pixel driving chips; and the fixed voltage signal lines are coupled to fixed voltage signal ends of the pixel driving chips of a column of the pixels arranged in the second direction.

6. The array substrate according to claim 5, wherein the pixel comprises at least: a red sub-pixel, a green sub-pixel, and a blue sub-pixel;

the plurality of the power signal lines are divided into a plurality of first power signal lines and a plurality of second power signal lines;

the first power signal lines are coupled to first electrodes of red sub-pixels of a column of the pixels arranged in the second direction; and the second power signal lines are coupled to first electrodes of green sub-pixels and blue sub-pixels of a column of the pixels arranged in the second direction.

7. The array substrate according to claim 5, further comprising a plurality of auxiliary signal lines;

the auxiliary signal lines extend in the first direction and are arranged in the second direction;

an auxiliary signal line of the auxiliary signal lines is located in a gap between two adjacent rows of the pixels arranged in the first direction; and the auxiliary signal lines and the fixed voltage signal lines are arranged in different layers, and each auxiliary signal line is coupled to at least one fixed voltage signal line through a second via hole; and the second via hole penetrates an insulating layer between the auxiliary signal line and the fixed voltage signal line.

8. A driving method for the array substrate according to claim 1, comprising:

each display frame comprising at least: an address assignment phase and a data signal transfer phase;

sequentially inputting addressing information into each addressing signal line in the address assignment phase; wherein the addressing information comprises address information corresponding to a row of pixels arranged in a first direction; and separately inputting data information to each data line in the data signal transfer phase; wherein the data information comprises a plurality of pieces of sub-data information; and each piece of sub-data information comprises address information corresponding to each pixel, and pixel data information, corresponding to the address information, of the pixel coupled to the data line.

9. The driving method according to claim 8, wherein the addressing information comprises a start instruction, the address information, an interval instruction, and an end instruction which are set in sequence.

10. The driving method according to claim 8, wherein the sub-data information comprises a start instruction, the address information, a data transfer instruction, an interval instruction, the pixel data information, and an end instruction which are set in sequence.

11. The driving method according to claim 8, wherein each display frame further comprises: a current setting phase prior to the data signal transfer phase; the method further comprises:

inputting current setting information into each data line in the current setting phase.

12. A display apparatus, comprising an array substrate, the array substrate comprising:

a base substrate;

a plurality of pixels located on the base substrate; wherein the plurality of the pixels are arranged in an array in a first direction and a second direction, and the first direction and the second direction intersect each other; at least one pixel of the plurality of the pixels comprises sub-pixels, and a pixel driving chip for driving each of the sub-pixels in the pixel; wherein a sub-pixel of the sub-pixels comprises at least one light emitting diode; and the pixel driving chip comprises a data signal end and an addressing signal end;

a plurality of addressing signal lines located on the base substrate; wherein an addressing signal line of the addressing signal lines is coupled to addressing signal ends of pixel driving chips of a row of the pixels arranged in the first direction, and the addressing signal ends of the pixel driving chips of the row of the pixels arranged in the first direction are connected in parallel through the addressing signal line; and a plurality of data lines located on the base substrate; wherein a data line of the data lines is coupled to data signal ends of pixel driving chips of a column of the pixels arranged in the second direction, and the data signal ends of the pixel driving chips of the column of the pixels arranged in the second direction are connected in parallel through the data line;

wherein each of the pixel driving chips is configured to drive one of the pixels.

* * * * *